United States Patent
Krikke et al.

(10) Patent No.: US 9,942,424 B2
(45) Date of Patent: Apr. 10, 2018

(54) PRINTING SYSTEM FOR DISPLAYING DIGITAL IMAGES

(71) Applicant: OCE-TECHNOLOGIES B.V., Venlo (NL)

(72) Inventors: Nanne Krikke, Nijmegan (NL); Andrea E. J. Meessen, Beek (NL)

(73) Assignee: OCE-TECHNOLOGIES B.V., Venlo (NL)

( * ) Notice: Subject to any disclaimer, the term of this patent is extended or adjusted under 35 U.S.C. 154(b) by 520 days.

(21) Appl. No.: 14/631,474

(22) Filed: Feb. 25, 2015

(65) Prior Publication Data
US 2015/0172475 A1    Jun. 18, 2015

Related U.S. Application Data

(63) Continuation of application No. PCT/EP2013/067081, filed on Aug. 15, 2013.

(30) Foreign Application Priority Data

Aug. 30, 2012  (EP) .................................... 12182430

(51) Int. Cl.
*G06F 3/0484* (2013.01)
*H04N 1/00* (2006.01)
(Continued)

(52) U.S. Cl.
CPC ......... *H04N 1/0044* (2013.01); *G06F 3/0486* (2013.01); *G06F 3/0488* (2013.01);
(Continued)

(58) Field of Classification Search
CPC .................................................. G06F 3/04845
(Continued)

(56) References Cited

U.S. PATENT DOCUMENTS

| | | | | |
|---|---|---|---|---|
| 5,392,388 A | * | 2/1995 | Gibson | G06F 3/04845 345/684 |
| 5,528,305 A | * | 6/1996 | Kim | H04N 7/0122 348/445 |

(Continued)

FOREIGN PATENT DOCUMENTS

WO    WO 96/38319 A2    12/1996

OTHER PUBLICATIONS

"Working screenshot of windows 7 service pack 1 mouse help" manufactured by Microsoft, released on Feb. 22, 2011, 9 pages.*

(Continued)

*Primary Examiner* — Reza Nabi
(74) *Attorney, Agent, or Firm* — Birch, Stewart, Kolasch & Birch, LLP

(57) ABSTRACT

A method of displaying a digital image having a high aspect ratio on a user interface screen connected to a control unit of a printing system includes the steps of determining a first part of the digital image, which part includes one end of the digital image in a longitudinal direction; determining a second part of the digital image, which part includes the other end of the digital image in the longitudinal direction; displaying the first part and the second part simultaneously on the user interface screen; and further displaying the remaining part of the digital image in a suppressed manner or a compressed manner in-between the first part and the second part at the user interface screen. A printing system includes a control unit, which includes a memory unit for storing a digital image, and a user interface screen for displaying the digital image, the control unit being configured to execute the method.

11 Claims, 8 Drawing Sheets

(51) Int. Cl.
*G06F 3/0488* (2013.01)
*G06F 3/0486* (2013.01)

(52) U.S. Cl.
CPC ..... *G06F 3/04845* (2013.01); *H04N 1/00411* (2013.01); *G06F 2203/04806* (2013.01); *H04N 2201/0082* (2013.01); *H04N 2201/0089* (2013.01)

(58) Field of Classification Search
USPC ........................................................ 715/803
See application file for complete search history.

(56) References Cited

U.S. PATENT DOCUMENTS

| | | | | |
|---|---|---|---|---|
| 5,537,149 | A * | 7/1996 | Teraoka | G06T 3/0012 348/132 |
| 5,771,042 | A * | 6/1998 | Santos-Gomez | G06F 3/0481 715/792 |
| 5,819,055 | A * | 10/1998 | MacLean | G06F 3/0481 715/798 |
| 5,870,090 | A * | 2/1999 | Takai | G06F 3/04842 715/788 |
| 6,492,985 | B1 * | 12/2002 | Mutz | G06F 3/04815 345/419 |
| 6,844,990 | B2 * | 1/2005 | Artonne | H04N 5/2254 348/E5.028 |
| 8,139,896 | B1 * | 3/2012 | Ahiska | G06T 3/0062 348/143 |
| 2004/0107439 | A1 * | 6/2004 | Hassell | H04N 5/44591 725/44 |
| 2009/0022422 | A1 * | 1/2009 | Sorek | G06T 3/4038 382/284 |
| 2011/0173566 | A1 * | 7/2011 | Ubillos | G06F 3/0483 715/800 |
| 2012/0069384 | A1 * | 3/2012 | De Boer | G06F 3/121 358/1.14 |
| 2012/0086771 | A1 * | 4/2012 | Wang | A61B 1/00009 348/36 |
| 2014/0143727 | A1 * | 5/2014 | Krikke | G06F 3/0482 715/835 |
| 2014/0173438 | A1 * | 6/2014 | Krikke | B65H 45/12 715/723 |
| 2015/0113480 | A1 * | 4/2015 | Krikke | G06F 9/4443 715/830 |
| 2015/0172475 | A1 * | 6/2015 | Krikke | G06F 3/0488 715/803 |
| 2016/0291908 | A1 * | 10/2016 | Hermus | G06F 3/1207 |
| 2017/0060506 | A1 * | 3/2017 | Krikke | G06F 3/1205 |
| 2017/0097796 | A1 * | 4/2017 | Krikke | G06F 3/1208 |
| 2017/0160917 | A1 * | 6/2017 | Krikke | G06F 3/04847 |

OTHER PUBLICATIONS

Griffiths, Brian, "Engineering Drawing for Manufacture", Elsevier Science, Oct. 2002, pp. 49-50, XP040426315.

\* cited by examiner

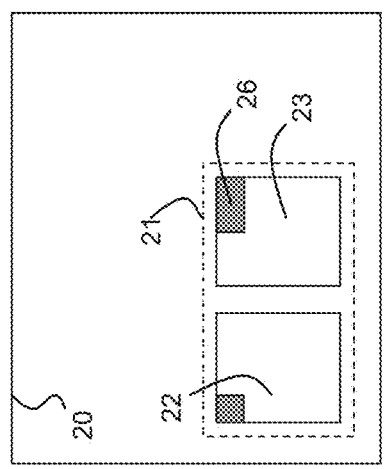
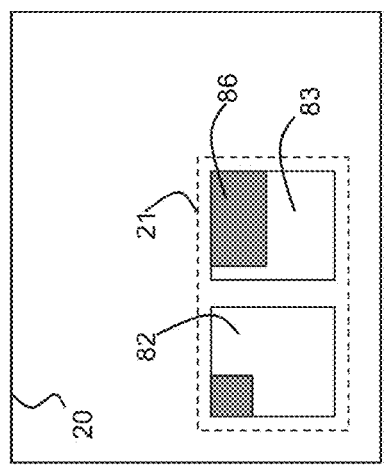
Fig. 8A
Fig. 8B

PRINTING SYSTEM FOR DISPLAYING DIGITAL IMAGES

CROSS-REFERENCE TO RELATED APPLICATIONS

This application is a Continuation of International Application No. PCT/EP2013/067081, filed on Aug. 15, 2013, and for which priority is claimed under 35 U.S.C. § 120. PCT/EP2013/067081 claims priority under 35 U.S.C. § 119(a) to Application No. 12182430.4, filed in Europe on Aug. 30, 2012. The entire contents of each of the above-identified applications are hereby incorporated by reference into the present application.

BACKGROUND OF THE INVENTION

1. Field of the Invention

The present invention relates to a printing system for printing digital images comprising a control unit and a user interface screen for displaying a digital image having an extreme aspect ratio.

2. Description of Background Art

An aspect ratio of a digital image may be defined as the proportion between a width and a length of the digital image. An extreme aspect ratio of a digital image may be defined as an aspect ratio of 1:2 or a higher ratio, 1:3 or a higher ratio, 1:4 or a higher ratio, in order to discern the images of an extreme ratio from the images in the well-known range of A0, A1, A2, A3, A4, A5 etc. or B0, B1, B2, B3, B4, B5, etc. The digital image may be in a PDF, BMP, JPEG or any other two-dimensional motionless format. Such an image having an extreme aspect ratio may be read from a storage device by a reading device, which is present in the control unit of the printing system. The storage device may be part of the printing system, but the storage device may also be an external storage device connected via a network to the printing system. A memory of the printing system may be used to partially read the digital image from the external storage into the memory of the printing system. The digital image may be displayed on a user interface screen of the printing system by only showing a part of the digital image, for example a mid-section. Displaying the whole digital image is not acceptable, since the details of the digital image are not visible any more due to an extreme aspect ratio of the digital image. A disadvantage of showing only a part of the digital image is that the user does not have the impression that the image is an image having an extreme aspect ratio. Another disadvantage is that the user may miss crucial information, which is not present in the shown part of the digital image, like a legend or title block of the digital image.

SUMMARY OF THE INVENTION

The printing system according to the present invention obviates these disadvantages wherein the control unit further comprises a first determining unit configured to determine a first part of the digital image, the first part comprising one end of the digital image in a longitudinal direction; and a second determination unit configured to determine a second part of the digital image, the second part comprising the other end of the digital image in the longitudinal direction, wherein the control unit is configured to control the user interface screen to simultaneously display the first part and the second part and to further display a remaining part of the digital image in a compressed manner in-between the first part and the second part or to suppress the remaining part of the digital image.

The first part of the digital image is determined by the first determining unit to comprise one end of the digital image in a longitudinal direction. The second part of the digital image is determined by the second determining unit to comprise the other end of the digital image in the longitudinal direction. By displaying the first part and second part on the user interface screen, both ends of the digital image in the longitudinal direction are displayed. The non-empty remaining part of the digital image is suppressed or displayed in a compressed manner in-between the first part and the second part. By doing so, the user immediately receives an intuitive visualization of the entire image. The inventors have also recognized that the legend or title block of an image is usually at one of the corners, and therefore at one of the ends of the digital image in the longitudinal direction. Since both ends of the digital image are visible, the legend or title block, if present at one end, is also visible. The remaining part may be suppressed in order to show only the first part and second part at a certain predetermined distance from each other. In another embodiment, the remaining part is compressed in-between the first part and the second part in order to give the user an impression that there is still a remaining part with image information. The degree of compression may be determined by the area size at which the first part, the second part and the remaining part have to be displayed on the user interface screen.

According to an embodiment of the printing system, the control unit is configured to control the user interface screen to simultaneously display the first part and the second part in a same order as in the digital image with respect to the longitudinal direction. The user still sees the first and second part of the original image in the same orientation as in the original image with respect to each other.

According to an embodiment of the printing system, the control unit is configured to replace the remaining part by a separation image. The user recognizes the separation image as the border area between the first part and second part.

The present invention also relates to a method of displaying a digital image having an extreme aspect ratio on a user interface screen, the method comprising the steps of determining a first part of the digital image, the first part comprising one end of the digital image in a longitudinal direction; determining a second part of the digital image, the second part comprising the other end of the digital image in the longitudinal direction; simultaneously displaying on the user interface screen the first part and the second part; and further displaying a remaining part of the digital image in a compressed manner in-between the first part and the second part or suppressing the remaining part of the digital image.

According to an embodiment of the method, the first part and the second part are displayed in a same order as in the digital image with respect to the longitudinal direction. The user still sees the first and second part of the original image in the same orientation as in the original image with respect to each other.

According to an embodiment of the method, the method further comprises the step of replacing the remaining part by a separation image. The user recognizes the separation image as the border area between the first part and the second part.

According to an embodiment of the method, the method further comprises the steps of dragging a border area between the first part and the second part displayed on the user interface screen towards one end of the first part, if the one end is farthest away from the border area, or towards the other end of the second part, if the other end is farthest away from the border area; re-determining the first part and the second part based on the amount of dragging, leaving a total size of the first part and the second part invariable; and displaying the re-determined first part and second part on the user interface screen, wherein the re-determined first part comprises the one end of the digital image in the longitudinal direction and the re-determined second part comprises the other end of the digital image in the longitudinal direction. A tangible object like a mouse, a stylus or a human finger in case of a touch screen may be used for dragging. By dragging the mouse pointer, the stylus or the human finger from the first part in the direction of the second part, the first part is extended in the longitudinal direction. At the same time, the second part is shrunk in the longitudinal direction. By dragging the tangible object from the second part in the direction of the first part, the second part is extended in the longitudinal direction. At the same time, the first part is shrunk in the longitudinal direction. By doing so, the area on the user interface screen, at which the first part and the second part are displayed, remains equal in size.

According to an embodiment of the method, the method further comprises the steps of touching one of the first part and the second part displayed on the user interface screen; re-determining the first part and the second part based on the part touched by increasing in size the touched part and decreasing in size the other part, leaving a total size of the first part and the second part invariable; and displaying the re-determined first part and second part on the user interface screen, wherein the re-determined first part comprises the one end of the digital image in the longitudinal direction and the re-determined second part comprises the other end of the digital image in the longitudinal direction. According to this embodiment, a touch of the first or second part is sufficient to increase the size of the touched part and decrease in size the non-touched part. The increase in size may be realized by extending the touched part in the longitudinal direction and at the same time the decrease in size may be realized by reducing the non-touched part in the longitudinal direction.

According to another embodiment, the touched part may also be zoomed in, gradually or directly to 100 percent of the original size of the digital image. The non-touched part may also be re-determined in a same zooming amount as the touched part or may be left unaltered. This embodiment may be realized by a touch gesture, a de-pinch gesture touch, a single click or a double click in order to distinguish the corresponding action from other actions like a longitudinal enlargement when combined with the previous embodiment.

According to an embodiment, the first part and the second part are determined such that facing sides of the first part and the second part on the user interface screen have counterpart shapes. By doing so, the space on the user interface screen between the first part and the second part is reduced to a minimum. The shapes are determined as to express the fact that there is a remaining part of the image between the first part and the second part.

The present invention also relates to a computer program product embodied on a non-transitory computer readable medium that when executed on a processor executes the method according to any of the previous embodiments.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8A and 8B illustrate the user interface screen when applying a gesture to the first part and the second part according to the fourth embodiment of the method according to the present invention.

DETAILED DESCRIPTION OF THE PREFERRED EMBODIMENTS

Figure 1:
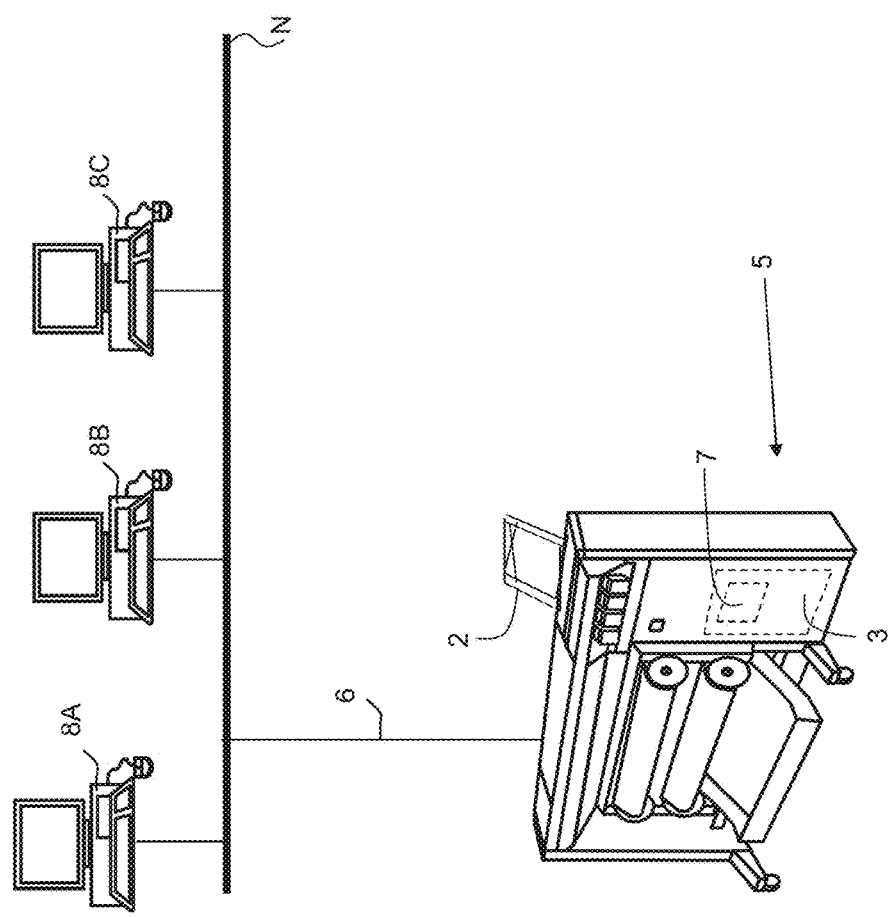
FIG. 1 illustrates a printing system according to the present invention.

The present invention will now be described with reference to the accompanying drawings, wherein the same reference numerals have been used to identify the same or similar elements throughout the several views.

In FIG. 1, a printing system is shown. However, other printing systems such as a copying system, a scanning system, a multi-functional system, a mobile device, a tablet personal computer, a user workstation, a printer driver system or a smart phone may be envisioned. FIG. 1 shows a printing system comprising workstations 8A-8C connected to a local network N. A reproduction apparatus 5 is available for a user working with one of the workstations 8A-8C and intending to send a print job comprising a set of documents from one of the workstations 8A-8C to the reproduction apparatus 5. The reproduction apparatus 5 is connected to the network N and suited for receiving print jobs from the workstations 8A-8C. The network N may be wireless.

The reproduction apparatus 5 comprises a user interface 2 suitable for displaying and selecting print jobs and their settings.

In an embodiment, each of the workstations 8A-8C is a personal computer provided with a processor unit, a display unit, a keyboard and a mouse or any other input device in order to let a user, who is logged in on a workstation, dispatch one or more print jobs to the reproduction apparatus 5. The dispatching may be done by means of a printer driver installed on one of the workstations 8A-8C. Such a printer driver may also be adapted to display print settings, to enter print settings and to display a preview of the image. The reproduction apparatus may be a printer for small and/or wide format documents.

In an embodiment, the reproduction apparatus 5 comprises a local user interface 2 for displaying print settings or a queue of print jobs and a control unit 3 comprising a storage device 7, such as a hard disk. The local user interface may be realized in the form of a touch screen. Alternatively, the local user interface may be a screen with a mouse and keyboard for enabling a user to enter commands in order to execute printing of digital documents. The reproduction apparatus 5 may comprise the local user interface 2 mounted on top of the reproduction apparatus 5 or integrated in a front panel of the reproduction apparatus 5. How the reproduction apparatus 5 is used in relation to the invention will be elucidated further on.

The control unit 3 is suited to store a queue of print jobs, to check whether or not the queue is empty and to submit a document from a queued print job to the print engine of the reproduction apparatus 5 in order to be printed. Documents of a print job are stored in the storage device 7 contained in the control unit 3 at least for the time period that the document is printed by the print engine and finished by a finisher.

The reproduction apparatus according to the present invention may be an electro-photographical printer, an inkjet printer, or any other kind of reproduction apparatus. According to an embodiment of the reproduction apparatus, sheets of receiving material are worked up by the reproduction apparatus. According to another embodiment, rolls of receiving material are worked up by the reproduction apparatus. Receiving material may be paper, textile, metal plates, printed circuit plates, solar cell plates, overhead sheet material, plastic or any other kind of suitable receiving material or substrate. The reproduction apparatus may comprise finishing options. However, finishing options of external finishing equipment may be arranged at the production system to finish a printed job and to deliver the printed job according to the wishes of a sender or a user of the print job.

The present invention relates to a method for displaying an image with an extreme aspect ratio on the local user interface 2 or the display unit of one of the workstations 8A-8C. A job to be printed may be displayed as a preview on one of the workstations 8A-8C, for example when a driver for the reproduction apparatus 5 is opened on the workstation. A job to be printed may also be displayed as a preview on the local user interface 2 of the reproduction apparatus 5 after the print job is sent from one of the workstations 8A-8C to the reproduction apparatus 5. In case of another kind of printing system, the image may be displayed at a display of the printing system. The display may be a touch screen or a multi-touch screen.

Figure 2:
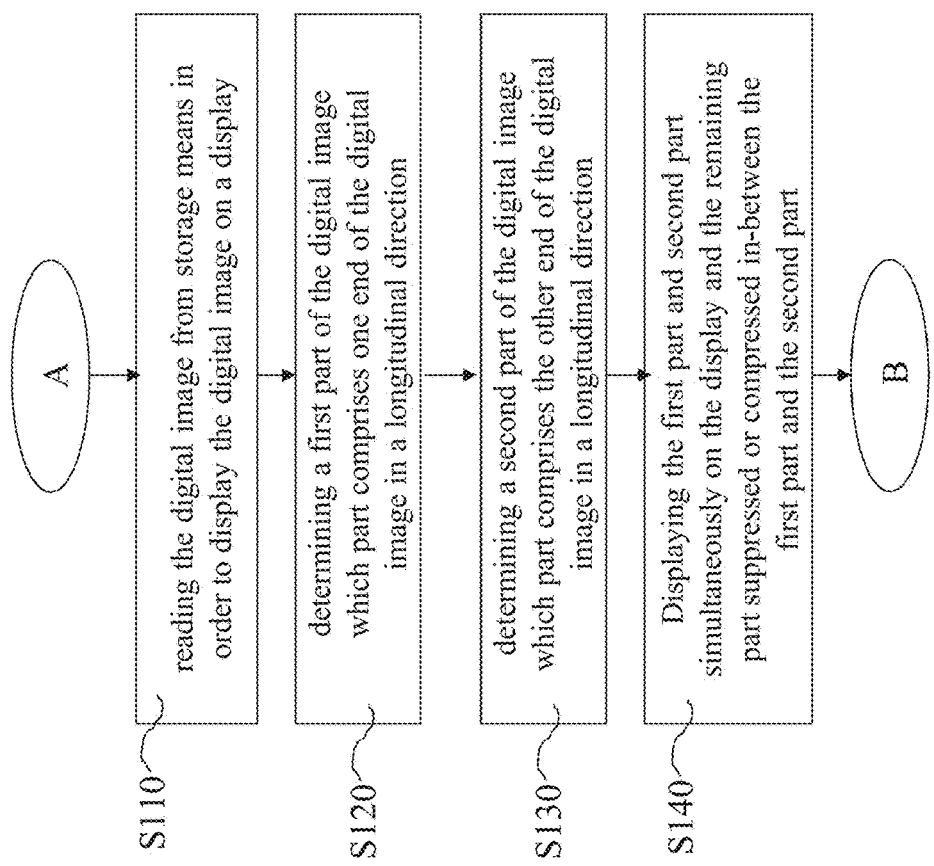
FIG. 2 is a flow diagram of an embodiment of the method according to the present invention.

FIG. 2 shows the steps of an embodiment of the method. At a starting point A, a digital image having the extreme aspect ratio is stored in a storage device. According to a first step S110 of the method, the digital image having the extreme aspect ratio is read from the storage device in a control unit of the printing system. The digital image is read from the storage device in order to display the image on the user interface screen of the printing system. In case of a reproduction system 5 according to FIG. 1, the digital image may be read from the storage device 7 in the control unit 3 of the reproduction system 5 in order to display the image on the user interface screen 2. In another embodiment, the digital image is read from a storage device inside one of the workstations 8A-8C. The digital image is read from such a storage device in order to display the image on the display unit of one of the workstations 8A-8C.

The digital image may be in a TIFF format, a JPEG format or any other suitable two-dimensional motionless image file format. The digital image may comprise m×n image pixels suitable for display on the user interface screen 2 or a display unit, e.g. a touch screen. It is assumed that the integer n is very much larger than the integer m. The digital image may be stored in the storage device in a compressed way in order to save memory.

According to a second step S120 of the method, a first part of the digital image, the first part comprising one end of the digital image in a longitudinal direction, is determined. The total size of the first part and the second part is determined by the available user interface display area on the user interface screen. A size of the first part is assumed approximately m×$n_1$, where $n_1$ is smaller than n, for example $n_1$ is smaller than or equals m.

The digital image may be organized in strips or bands. Each strip consists of a number of rows of pixels or columns of pixels depending on an orientation of the digital image. This is advantageous for determining a part of the digital image, since it enables a fast random access and efficient I/O buffering. The first part may be determined to be a predetermined number of strips. For low-resolution to medium-resolution images, the method of breaking the image into strips is adequate.

The digital image may be organized in tiles instead of strips. This is advantageous for high-resolution images, which can be accessed more efficiently—and compression tends to work better—if the image is broken into roughly square tiles. It is also advantageous to optimize the reading of the image file when rotation of the image is applied before displaying the image in a user interface display area. By rotating the image, consecutive tiles or strips may be read to obtain the first part of the digital image and consecutive tiles or strips may be read to obtain the second part of the digital image. The first part may be determined to be a predetermined number of tiles. A file format that supports the organization of strips and tiles is a TIFF image file format or a JPEG image file format.

According to a third step S130 of the method, a second part of the digital image, the second part comprising the other end of the digital image in the longitudinal direction, is determined. The total size of the first and second part is determined by the available user interface display area on the user interface screen. A size of the second part is assumed approximately m×$n_2$, where $n_2$ is smaller than n, for example $n_2$ is smaller than or equals m. The second part may be determined to be a predetermined number of strips or a predetermined number of tiles.

According to a fourth step S140, the first part and the second part are displayed simultaneously on the user interface screen together with a non-empty remaining part of the digital image in a suppressed manner or a compressed manner in-between the first part and the second part. The first part is showing the one end of the digital image on the display screen in its entire lateral width. The second part is showing the other end of the digital image on the display screen in its entire lateral width. The orientation of the first part and the second part corresponds to the orientation of the first part and the second part in the original digital image. At the end point B, the first and second part are displayed on the user interface screen as a preview.

Figure 3A:
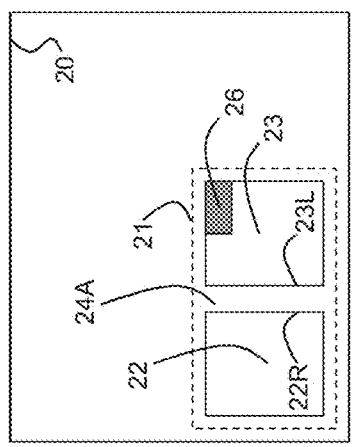
FIGS. 3A-3D illustrates the first part and the second part of the digital image at the user interface screen.

FIG. 3A shows a user interface screen 20 comprising a preview area 21 for showing the digital image. Since the digital image has an extreme aspect ratio, a first part 22 of the digital image and a second part 23 of the digital image are shown. The first part 22 comprises the left end of the digital image in its entire lateral width. The lateral width is shown in FIG. 3A as a vertical distance of the first part 22. The second part 23 comprises the right end of the digital image in its entire lateral width. The lateral width is shown in FIG. 3A as a vertical distance of the second part 23 being equal to the vertical distance of the first part 22. Facing sides 22R and 23L have identical counter parts, so as to minimize the space 24A between the left part 22 and the right part 23. According to an embodiment shown in FIG. 3A, each facing side 22R, 23L has a line shape. One of the first part 22 and the second part 23 may contain a legend or title block of the digital image. In FIG. 3A, a title block 26 is situated in the second part 26 and completely visible in the preview area 21. In FIG. 3A, the remaining part of the digital image between the first part and the second part is suppressed.

Figure 3C:
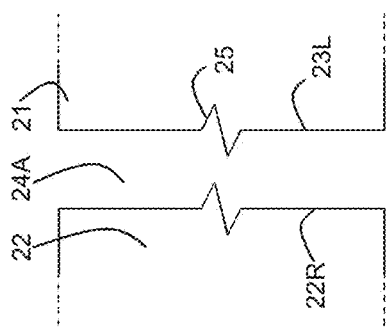
Figure 3B:
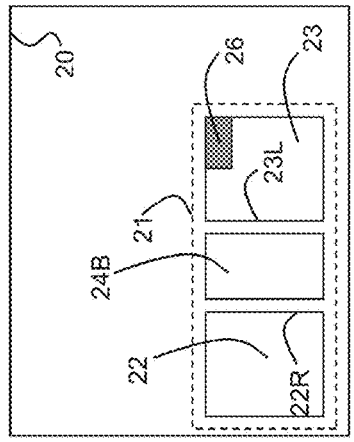

FIG. 3B shows a user interface screen 20 comprising a preview area 21 for showing the digital image. Since the digital image has an extreme aspect ratio, a first part 22 of the digital image and a second part 23 of the digital image is shown. The first part 22 comprises the left end of the digital image in its entire lateral width. The lateral width is shown in FIG. 3B as a vertical distance of the first part 22. The second part 23 comprises the right end of the digital image in its entire lateral width. The lateral width is shown in FIG. 3B as a vertical distance of the second part 23 being equal to the vertical distance of the first part 22. Facing sides 22R and 23L have identical counter parts, so as to minimize the spaces between the left part 22 and the remaining part 24B, and the remaining part 24B and the right part 23. In FIG. 3B, the remaining part of the digital image is compressed in-between the first part 22 and the second part 23 as an image 24B. The total size of the compressed image 24B and the left part 22 and the right part 23 depends on the size of the preview area 21.

Figure 3D:
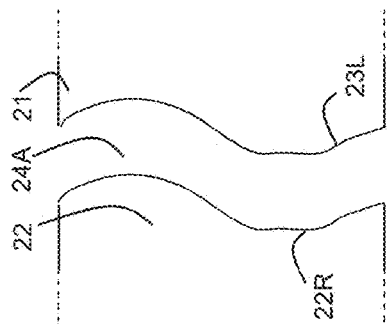

FIG. 3C and FIG. 3D show examples of other counter part shapes for the first part, for the second part and, if visible as in FIG. 3B, the remaining part. In FIG. 3C, a wave form 25 is part of both facing edges 22R, 23L. In FIG. 3D, both facing edges 22R, 23L are shaped according to a same curve.

Figure 4:
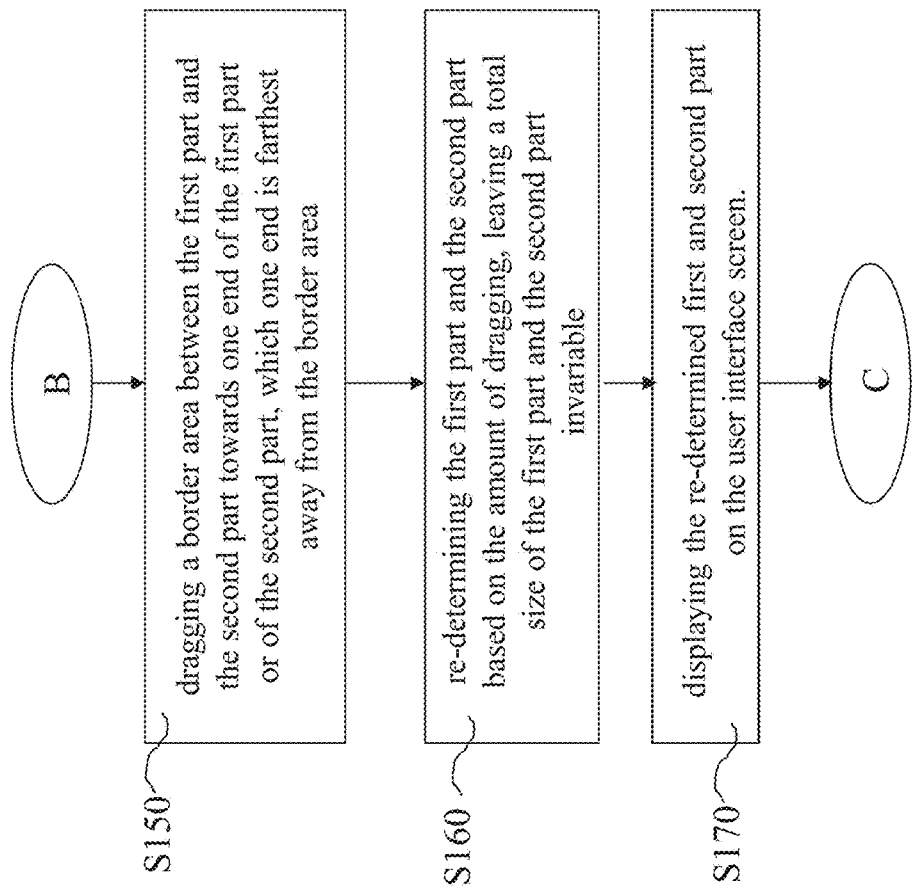
FIG. 4 is a flow diagram of a second embodiment of the method according to the present invention.

FIG. 4 shows the steps of another embodiment of the method. The first four steps 110, 120, 130, 140 are the same as in the method according to FIG. 2. A starting point B in FIG. 4 corresponds to the end point B in FIG. 2.

Figure 5A:
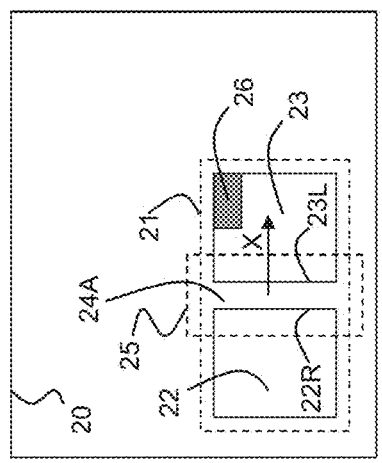
FIGS. 5A and 5B illustrate the user interface screen when applying a gesture to the first part and the second part according to the second embodiment of the method according to the present invention.

According to an additional fifth step S150 of the method, a border area between the first part and the second part displayed on the user interface screen is dragged towards one end of the first part, which one end is farthest away from the second part, or is dragged towards one end of the second part, which one end is farthest away from the first part. The border area may comprise the space in-between the first part and the second part. The border area may partly overlap the first part and the second part at their facing sides. This is advantageous, since the user does not have to place the mouse pointer, the stylus or a human finger on the user interface screen very accurately. A border area 25 and a direction X of dragging is shown in FIG. 5A. The border area 25 comprises the space 24A in-between the first part 22 and the second part 23. The border area 25 partly overlaps the first part 22 and the second part 23 at their facing sides 22R, 23L.

According to an additional sixth step S160 of the method, the first part and the second part are re-determined based on the amount of dragging, leaving a total size of the first part and the second part unaltered. In case of dragging in the direction X as shown in FIG. 5, a larger part of the image comprising the first part is read from storage, while the second part is a re-determined by taking a smaller part from the second part.

Figure 5B:
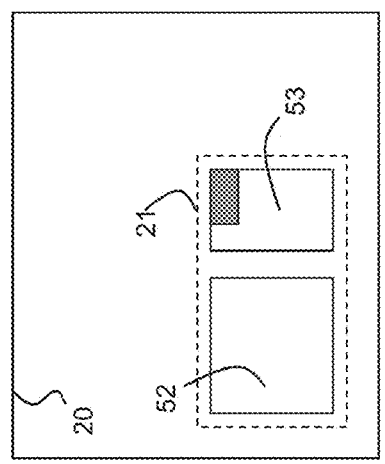

According to an additional seventh step S170, the re-determined first part 52 and the re-determined second part 53 are displayed on the user interface screen 20 as shown in FIG. 5B. The total size of the re-determined first part 52 and the re-determined second part 53 is the same as the total size of the original first part 22 and the original second part 23 as shown in FIG. 5A. Then, the end point C of the method is reached.

Figure 6:
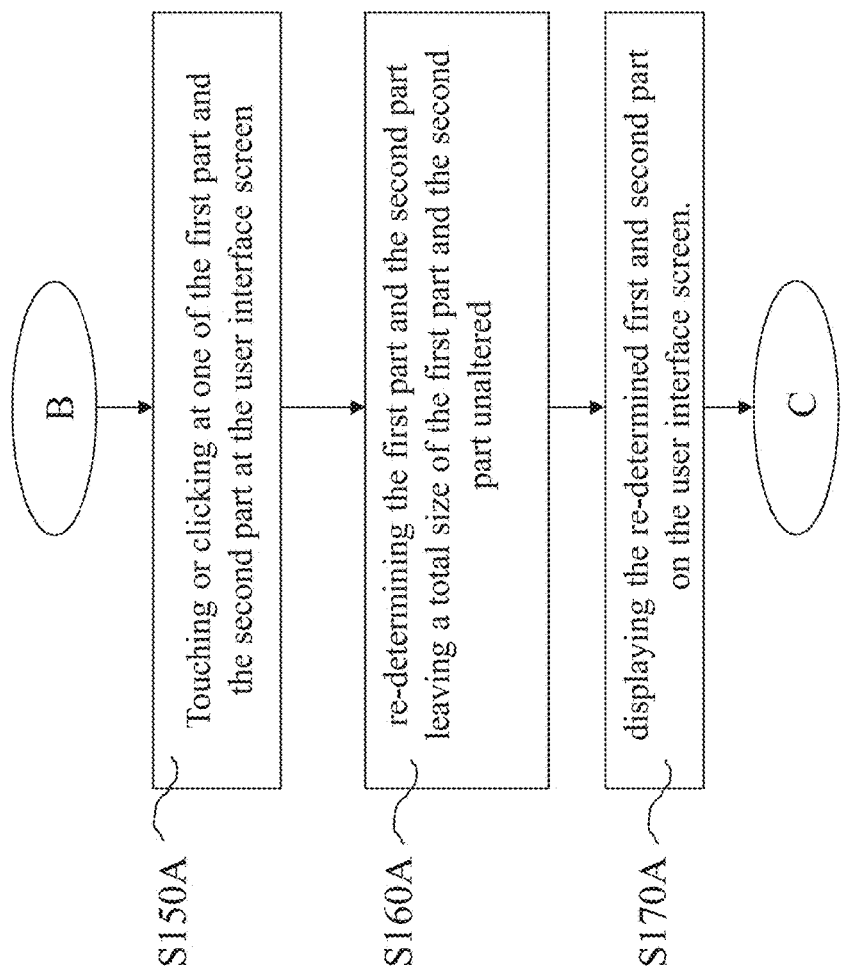
FIG. 6 is a flow diagram of a third embodiment of the method according to the present invention.

FIG. 6 shows the steps of another embodiment of the method. The first four steps S110, S120, S130, and S140 are the same as in the method according to FIG. 2. A starting point B in FIG. 6 corresponds to the end point B in FIG. 2.

According to an additional fifth step S150A of the method, one of the first part and the second part is touched or clicked at on the user interface screen.

According to an additional sixth step S160A, the first part and the second part are re-determined based on the part touched by increasing in size the touched part and decreasing in size the other part, leaving a total size of the first part and the second part invariable. The amount of increase and decrease may be predetermined per touch or click. In another embodiment, the amount of increase and decrease may depend on the duration of a touch on the respective part.

According to an additional seventh step 170A, the re-determined first and second part are displayed on the user interface screen. Then, the end point C of the method is reached.

Figure 7:
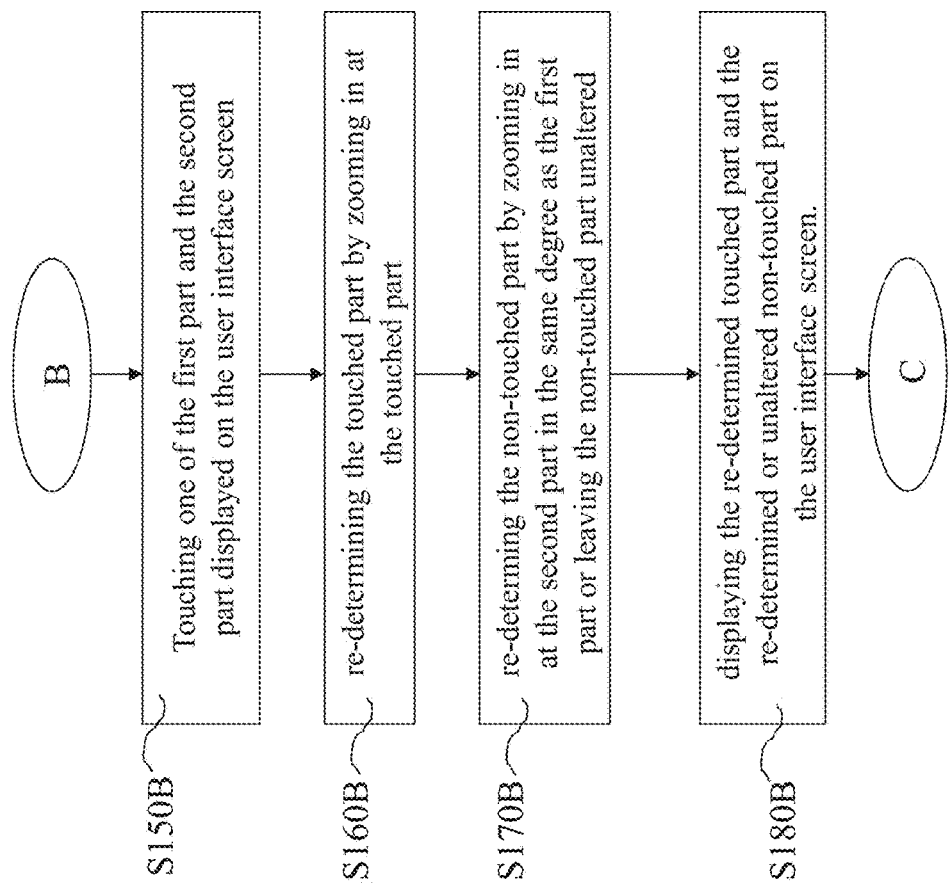
FIG. 7 is a flow diagram of a fourth embodiment of the method according to the present invention.

FIG. 7 shows the steps of another embodiment of the method. The first four steps S110, S120, S130, and S140 are the same as in the method according to FIG. 2. A starting point B in FIG. 7 corresponds to the end point B in FIG. 2.

According to an additional fifth step S150B of the method, one of the first part and the second part displayed on the user interface screen is touched. According to an additional sixth step S160B, the touched part is re-determined by zooming in at the touched part. Due to the zooming in, the lateral width does not fit any more in the preview area. According to an additional seventh step S170B, the non-touched part is re-determined by zooming in at the non-touched part in a same amount as zooming in at the touched part or by leaving the non-touched part unaltered. According to an additional seventh step S180B, the re-determined touched part and the re-determined or unaltered non-touched part are displayed on the user interface screen. Then, the method reaches its end point C. In another embodiment, the zooming step is implemented by enlarging the preview area 21. The touched part as well as the non-touched part are then extended in a same degree of extension.

FIG. 8 shows the preview area 21 again. The first part 22 and the second part 23 are shown in FIG. 8A. Now, the second part 23 is touched. FIG. 8B shows the resulting preview area after the touch of the second part 23. The first part 22 is also re-determined by zooming in at the same degree as zooming in at the second part 23. According to FIG. 8, the re-determined first part is now indicated as a re-determined first part 82. The second part 23 is zoomed in at and now a re-determined second part 83 is shown. The title block 26 of FIG. 8A, being part of the second part 23, is enlarged to a title block 86 in FIG. 8B. The way of zooming may be determined by the location of the touch on the first part 22 or the second part 23. The zooming may also be initiated by a de-pinch gesture in case of a multi-touch screen.

In another embodiment, a zoom icon is provided at the user interface display area 21 for zooming in at the first or second part, when the zoom icon is positioned at the first or second part respectively.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A printing system for printing digital images, the printing system comprising:
   a processor;
   a user interface screen configured to display a digital image intended to be printed by the printing system, the digital image having a width, a length and an extreme aspect ratio, being a proportion between the width and the length;
   the processor being configured to determine a first part of the digital image, the first part comprising one end of the digital image in a longitudinal direction; and
   the processor being configured to determine a second part of the digital image, the second part comprising the other end of the digital image in the longitudinal direction,
   wherein the processor is configured to control the user interface screen to simultaneously display the first part and the second part in a same order from left to right in the digital image with respect to the length of the digital image and to further display a remaining part of the digital image between the first part and the second part in a compressed manner in-between the first part and the second part or to suppress the remaining part of the digital image, and
   wherein facing edges of the first part and the second part are shaped according to a same curve.

2. The printing system according to claim 1, wherein the processor is configured to replace the remaining part by a separation image.

3. The printing system according to claim 1, wherein a wave form is part of the facing edges of the first part and the second part.

4. A method of displaying a digital image intended to be printed by a printing system, the digital image having a width, a length and an extreme aspect ratio, being a proportion between the width and the length on a user interface screen of the printing system, the method comprising the steps of:
   determining a first part of the digital image, the first part comprising one end of the digital image in a longitudinal direction;
   determining a second part of the digital image, the second part comprising the other end of the digital image in the longitudinal direction;
   simultaneously displaying on the user interface screen the first part and the second part in a same order from left to right in the digital image with respect to the length of the digital image; and
   further displaying a remaining part of the digital image between the first part and the second part in a compressed manner in-between the first part and the second part or suppressing the remaining part of the digital image,
   wherein facing edges of the first part and the second part are shaped according to a same curve.

5. The method according to claim 4, further comprising the step of replacing the remaining part by a separation image.

6. The method according to claim 4, further comprising the steps of:
   dragging a border area between the first part and the second part displayed on the user interface screen towards the one end of the first part, when the one end of the first part is farthest away from the border area or towards the other end of the second part, when the other end of the second part is farthest away from the border area;
   re-determining the first part and the second part based on the amount of dragging, leaving a total size of the first part and the second part invariable; and
   displaying the re-determined first part and second part on the user interface screen,
   wherein the re-determined first part comprises the one end of the digital image in the longitudinal direction and the re-determined second part comprises the other end of the digital image in the longitudinal direction.

7. The method according to claim 4, further comprising the steps of:
   touching one of the first part and the second part displayed on the user interface screen;
   re-determining the touched part by zooming in at the touched part;
   re-determining the non-touched part by zooming in at the non-touched part in a same degree as zooming in at the touched part; and
   displaying the re-determined touched part and the re-determined non-touched part on the user interface screen,
   wherein the re-determined first part comprises the one end of the digital image in the longitudinal direction and the re-determined second part comprises the other end of the digital image in the longitudinal direction.

8. The method according to claim 4, further comprising the steps of:
   touching one of the first part and the second part displayed on the user interface screen;
   re-determining the touched part by zooming in at the touched part;
   leaving the non-touched part unaltered; and
   displaying the re-determined touched part and the unaltered non-touched part on the user interface screen,
   wherein the re-determined touched part comprises the one end of the digital image in the longitudinal direction, if the touched part is equal to the first part, and wherein the re-determined touched part comprises the other end of the digital image in the longitudinal direction, if the touched part is equal to the second part.

9. The method according to claim 4, wherein the first part and the second part are determined such that facing sides of the first part and second part on the user interface screen have counterpart shapes.

10. A computer program product embodied on a non-transitory computer readable medium that when executed on a processor executes the method according to claim 4.

11. The method according to claim 4, wherein a wave form is part of the facing edges of the first part and the second part.

* * * * *